(12) United States Patent
Bouiron et al.

(10) Patent No.: US 11,413,989 B2
(45) Date of Patent: Aug. 16, 2022

(54) METHOD FOR AUTOMATIC CALIBRATION AND ASSOCIATED ACTUATION DEVICE AND SEAT

(71) Applicant: PGA Electronic, Montierchaume (FR)

(72) Inventors: Cédric Bouiron, Montierchaume (FR); Quentin Pillet, Montierchaume (FR)

(73) Assignee: PGA ELECTRONIC, Montierchaume (FR)

( * ) Notice: Subject to any disclaimer, the term of this patent is extended or adjusted under 35 U.S.C. 154(b) by 255 days.

(21) Appl. No.: 16/468,854

(22) PCT Filed: Dec. 14, 2017

(86) PCT No.: PCT/FR2017/053576
§ 371 (c)(1),
(2) Date: Jun. 12, 2019

(87) PCT Pub. No.: WO2018/109403
PCT Pub. Date: Jun. 21, 2018

(65) Prior Publication Data
US 2019/0344685 A1    Nov. 14, 2019

(30) Foreign Application Priority Data
Dec. 16, 2016  (FR) ..................... 16 62686

(51) Int. Cl.
*B60R 22/00*    (2006.01)
*B60N 2/02*    (2006.01)
(Continued)

(52) U.S. Cl.
CPC ........... *B60N 2/0248* (2013.01); *B60N 2/929* (2018.02); *G05B 19/4015* (2013.01); *B60N 2/22* (2013.01);
(Continued)

(58) Field of Classification Search
CPC ...... B60N 2/0248; B60N 2/929; B60N 2/995; B60N 2/22; B60N 2/0244; G05B 19/4015;
(Continued)

(56) References Cited

U.S. PATENT DOCUMENTS

| | | | | |
|---|---|---|---|---|
| 5,074,053 A | * | 12/1991 | West ..................... | G01B 7/003 33/708 |
| 2008/0255788 A1 | * | 10/2008 | Muhammad .......... | B64D 11/06 702/94 |

(Continued)

FOREIGN PATENT DOCUMENTS

WO    2014/009356 A1    1/2014

OTHER PUBLICATIONS

International Search Report for International Application No. PCT/FR2017/053576 dated Apr. 24, 2018.
(Continued)

*Primary Examiner* — Shardul D Patel
(74) *Attorney, Agent, or Firm* — Pearne & Gordon LLP

(57) ABSTRACT

A method for automatic calibration of a device for actuating at least one element to be actuated in a structure, the actuation device comprising at least one actuator configured to actuate at least one corresponding element to be actuated. The method comprises the steps of: controlling the movement of each actuator to place each element in a predetermined reference position; and for each actuator: controlling the movement of the actuator in a first direction; if the value of a parameter associated with the actuator exceeds a first reference value, controlling the movement of the actuator in a second direction, opposite to the first direction; if the value of the parameter exceeds a second reference value, recording the position occupied by the actuator as the position of a first mechanical stop of the actuator.

12 Claims, 3 Drawing Sheets

(51) Int. Cl.
*B60N 2/90* (2018.01)
*G05B 19/401* (2006.01)
*B60N 2/22* (2006.01)

(52) U.S. Cl.
CPC ...... *B60N 2/995* (2018.02); *G05B 2219/2637* (2013.01); *G05B 2219/41099* (2013.01); *G05B 2219/45022* (2013.01)

(58) Field of Classification Search
CPC .. G05B 2219/2637; G05B 2219/41099; G05B 2219/45022; B60R 22/00
USPC .......................................................... 701/49
See application file for complete search history.

(56) References Cited

U.S. PATENT DOCUMENTS

| | | | |
|---|---|---|---|
| 2010/0026230 A1* | 2/2010 | Lee ........................ | G05B 19/19 318/627 |
| 2013/0113250 A1* | 5/2013 | Udriste ............ | B64D 11/06395 297/217.3 |
| 2015/0137790 A1* | 5/2015 | Piaulet ..................... | B60N 2/23 324/71.1 |

OTHER PUBLICATIONS

Written Opinion for International Application No. PCT/FR2017/053576 dated Apr. 24, 2018.

\* cited by examiner

METHOD FOR AUTOMATIC CALIBRATION AND ASSOCIATED ACTUATION DEVICE AND SEAT

TECHNICAL FIELD

The present invention relates to a method for automatic calibration of an actuation device with at least one element to be actuated of a structure, the actuation device comprising a calculation unit and at least one actuator configured to actuate at least one corresponding element to be actuated.

The invention applies to the field of actuation devices for elements to be actuated, in particular seat elements. More specifically, it relates to a method for calibrating an actuation device of one or a plurality of elements to be actuated, in particular one or a plurality of seat elements.

STATE OF THE PRIOR ART

In order to be able to modify the position of a user installed on a seat according to the desires thereof or imposed circumstances, it is known to equip the seats with electric actuation devices making it possible to vary the configurations of the seat by moving moveable seat elements. Such seats are found, for example, in transport vehicles such as aircraft, boats and railway carriages.

A seat may, for example, comprise seat elements such as an inclinable seatback articulated at one end of a seat base and a leg rest articulated at the other end of the seat base. The configuration of each seat element may be modified by the intermediary of an actuation device capable of controlling, independently or simultaneously, the movement of actuators placed at the level of the seat elements.

Moreover, in order to know at each instant the position of the actuators, and therefore the position of the seat elements, it is known to provide in association with the actuators transducers such as potentiometers making it possible to collect measurement values that represent the physical positions of the actuators.

Before using the seat, it is necessary to calibrate each actuator, in particular via the potentiometer associated with the actuator, so that the actuation device is capable of controlling the movement of each actuator within the authorised range of movement thereof (between the minimum stop thereof and the maximum stop thereof, same resulting from mechanical or imposed limits), in order to enable a change in configuration of each seat element.

In order to carry out the calibration of the actuators of the actuation device, it is known to manually move each seat element between the two end positions thereof and read the two corresponding values provided by the potentiometer in order to perform the calibration.

Methods for calibrating actuators are also known wherein the calibration of the actuators is performed before the mounting of the actuators in the environment thereof on the seat, and said mounting of the actuators on the seat is performed systematically by placing the seat beforehand in a predefined position.

The existing solutions of prior art are not entirely satisfactory. On the one hand, it may be tedious and take an excessive amount of time to perform a manual calibration of each actuator by movement towards the end positions thereof. For example, the mechanical disengagement controls are generally difficult to access, which makes the manipulation thereof tedious. On the other hand, it may be restrictive and uncomfortable for the operator to have to perform the mounting of the actuation device in the environment thereof on the seat when the seat is in a single and unique predetermined position. The operator may also be subjected to difficulties of posture and effort for moving the entire seat.

There is a need to have a new method for calibrating an actuation device, enabling a more comfortable and faster calibration of the actuators. There is also a need to enable such a calibration independently of the position of the structure, in particular a seat, receiving the actuators during the mounting of the actuators.

There is also a need to have a new calibration method that is easy to implement, and wherein the operator in charge of the implementation does not require specialist knowledge or specific training.

The invention aims to meet all or a portion of said needs.

DISCLOSURE OF THE INVENTION

To this end, the aim of the invention is a method for automatic calibration of the type mentioned above, comprising the steps of:
  controlling, by the calculation unit, the movement of each actuator to place each element to be actuated of the structure in a predetermined reference position;
  for each actuator:
    operating the movement of the actuator in a first direction;
    comparing the value of a characteristic variable associated with the actuator with a first predetermined reference value;
    if the value of the characteristic variable exceeds the first reference value, operating the movement of the actuator in a second direction opposite to the first direction;
    comparing the value of the characteristic variable associated with the actuator with a second predetermined reference value;
    if the value of the characteristic variable exceeds the second reference value, saving the position occupied by the actuator as the position of a first mechanical stop of the actuator.

By implementing such a method, the calibration of the seat does not require positioning of the seat in a predefined configuration or the intervention of an operator during the calibration. Indeed, by implementing such a method, the seat is placed autonomously in a predetermined reference position, then automatically determines a stop of the actuators, so as to calibrate each actuator.

According to other advantageous aspects of the invention, the automatic calibration method comprises one or a plurality of the following characteristics, taken individually or according to all technically possible combinations:
  the method further comprises the steps of:
    second operation of the movement of the actuator in the first direction;
    comparing the value of the characteristic variable associated with the actuator with a first predetermined reference value;
    if the value of the characteristic variable exceeds the first reference value, saving the position occupied by the actuator as the position of a second mechanical stop of the actuator.
  the method comprises the determination of a mechanical stroke of the actuator, the mechanical stroke of the actuator being taken equal to the absolute value of the difference between the position associated with the first mechanical stop and the position associated with the second mechanical stop of the actuator;

the method further comprises the steps of:

comparing the calculated mechanical stroke of the actuator with a positive predetermined auxiliary stroke associated with the actuator;

if the mechanical stroke calculated is greater than or equal to the auxiliary stroke, calculating a minimum auxiliary stop and a maximum auxiliary stop of the actuator, the minimum auxiliary stop being calculated by adding a positive predetermined offset to the smallest among the first mechanical stop and the second mechanical stop, the maximum auxiliary stop being calculated by adding the auxiliary stroke to the calculated minimum auxiliary stop or the maximum auxiliary stop being calculated by taking away a positive predetermined offset from the largest among the first mechanical stop and the second mechanical stop, the minimum auxiliary stop being calculated by taking away the auxiliary stroke from the calculated maximum auxiliary stop;

before the placement step, the structure is located in any position and each actuator is located in any position;

the placement step comprises, so long as the structure is not located in the predetermined reference position:

operating the movement of a given actuator in a first direction;

monitoring the verification of a predetermined condition of a pre-established sequence of conditions;

if the predefined condition is met, then:

if the movement of the actuator in the first direction is required by the sequence of conditions, operating the movement of the actuator in the first direction and monitoring the verification of a next predetermined condition of the pre-established sequence of conditions;

if the movement of the actuator in a second direction, opposite to the first direction, is required by the sequence of conditions, operating the movement of the actuator in the second direction and monitoring the verification of a next predetermined condition of the pre-established sequence of conditions;

if neither the movement of the actuator in the first direction nor the movement of the actuator in the second direction is required by the sequence of conditions, operating the movement of a different actuator and monitoring the verification of a next predetermined condition of the pre-established sequence of conditions;

at least one condition is selected among the group consisting of:

the value of the characteristic variable associated with the actuator is greater than a reference value;

a time setpoint has been reached, the time setpoint corresponding to a maximum period elapsed between the actuation of the actuator during operation of the movement of the actuator and a current instant; and a reference position of the actuator has been reached, if the actuator is already calibrated;

the structure is a seat, in particular an aircraft seat, the element or elements to be actuated being seat elements.

Furthermore, the aim of the invention is an actuation device including a calculation unit configured to implement the automatic calibration method as defined above.

The aim of the invention is also a seat including moveable elements, the seat being equipped with an actuation device as defined above, the actuation device being configured to control the position of the moveable elements.

BRIEF DESCRIPTION OF THE DRAWINGS

The invention will be better understood using the following description, given by way of non-limiting example and made in reference to the appended drawings, wherein.

DETAILED DISCLOSURE OF SPECIFIC EMBODIMENTS

An example of implementation of the automatic calibration method according to the invention is illustrated in FIGS. 1 to 4.

Figure 1:
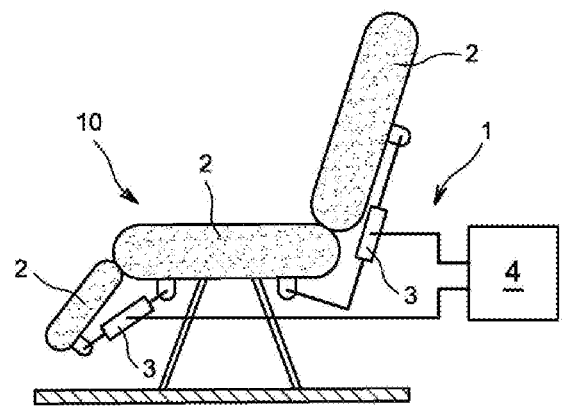
FIG. 1 is a schematic representation of a structure equipped with an actuation device according to the invention.

An example of structure 10 in the form of a seat, for example an aircraft seat, is shown in FIG. 1. The structure 10 comprises three elements to be actuated 2 in the form of seat elements.

The seat elements 2 correspond, for example, to an inclinable seatback, a seat base and a leg rest.

The seat elements 2 of the seat 10 may be set in motion by means of an actuation device 1 comprising actuators 3, in order to modify the configuration of use of the seat 10.

The configuration of use of the seat 10 includes, for example, a TTL (acronym for "taxiing, take-off and landing") position, or even a bed position. The configuration of use of the seat 10 further includes, at least one reference position, described later.

The actuators 3 are, for example, electric actuators. As an alternative, the actuators are hydraulic actuators, pneumatic actuators, or any other type of actuator known.

The actuators 3 are connected to a calculation unit 4 configured to carry out the automatic calibration of the actuators 3 of the actuation device 1.

The calculation unit 4 is configured to determine, for each actuator 3, a minimum mechanical stop and a maximum mechanical stop defining the maximum range of movement of the actuator 3. The maximum range of movement of the actuator 3 corresponds to the range defined between the two end positions wherein the actuator 3 is in abutment. More specifically, the minimum mechanical stop is reached either when the actuator is located in a completely retracted position, or when the seat element 2 set in motion by the actuator 3 may no longer be moved further, preventing complete retraction of the actuator 3. Furthermore, the maximum mechanical stop is reached either when the actuator is located in a completely deployed position, or when the seat element 2 set in motion by the actuator 3 may no longer be moved further, preventing complete deployment of the actuator 3.

The calculation unit 4 is also configured to determine, for each actuator 3, a minimum auxiliary stop and a maximum auxiliary stop. The minimum auxiliary stop and the maximum auxiliary stop delimit an authorised range of movement using a reference position of the seat 10, taken as the position of origin.

For example, the calculation unit 4 calculates the minimum auxiliary stop by adding a positive predetermined offset to the minimum mechanical stop. Then, the calculation unit 4 calculates the maximum auxiliary stop by adding a positive predetermined auxiliary stroke to the calculated minimum auxiliary stop.

According to another example, the calculation unit 4 calculates the maximum auxiliary stop by taking away a positive predetermined offset from the maximum mechanical stop. Then, the calculation unit 4 calculates the minimum auxiliary stop by taking away a positive predetermined auxiliary stroke from the calculated maximum auxiliary stop.

The auxiliary stroke of the actuator 3 is a predetermined parameter corresponding to the stroke authorised for the actuator 3 according to the seat element 2 to which the actuator 3 is connected. The auxiliary stroke of the actuator 3 is less than or equal to the mechanical stroke of the actuator 3.

The calculation unit 4 is, furthermore, configured to compare the value of a characteristic variable of the operation of each actuator 3 with at least one predetermined reference value associated with the actuator 3. For example, in the case of an electric actuator, such a characteristic variable is the electric current consumed by the actuator. According to another example, in the case of a hydraulic actuator, such a characteristic variable is the pressure of the drive fluid of the actuator.

Figure 3:
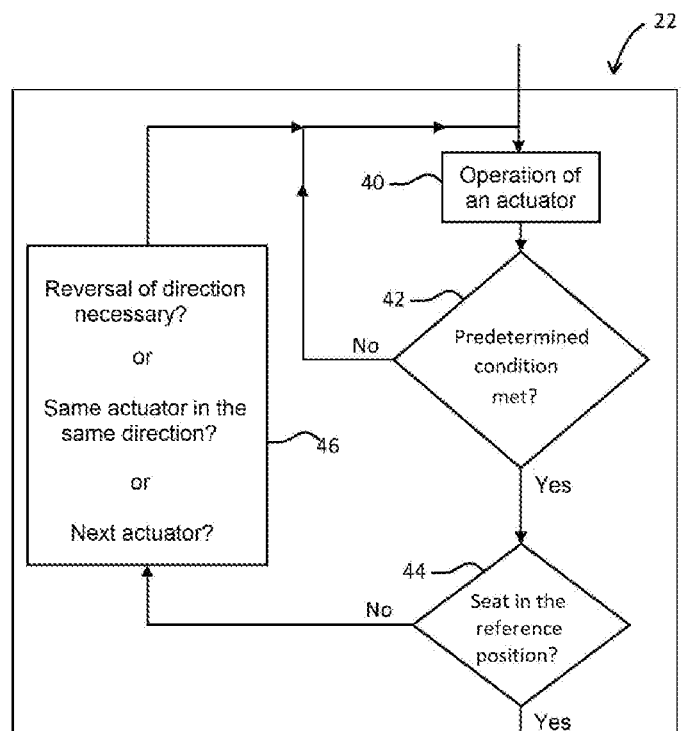
FIG. 3 is a flow chart illustrating the sequence of a placement step of the method in FIG. 2.
Figure 2:
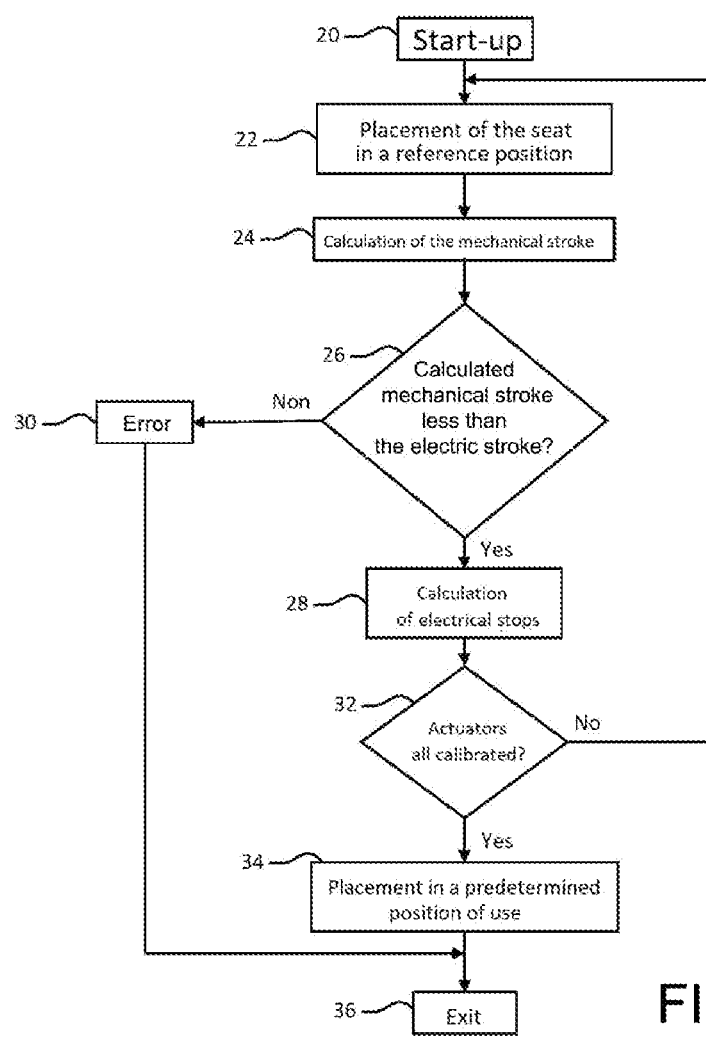
FIG. 2 is a flow chart illustrating the sequence of the method according to the invention.
Figure 4:
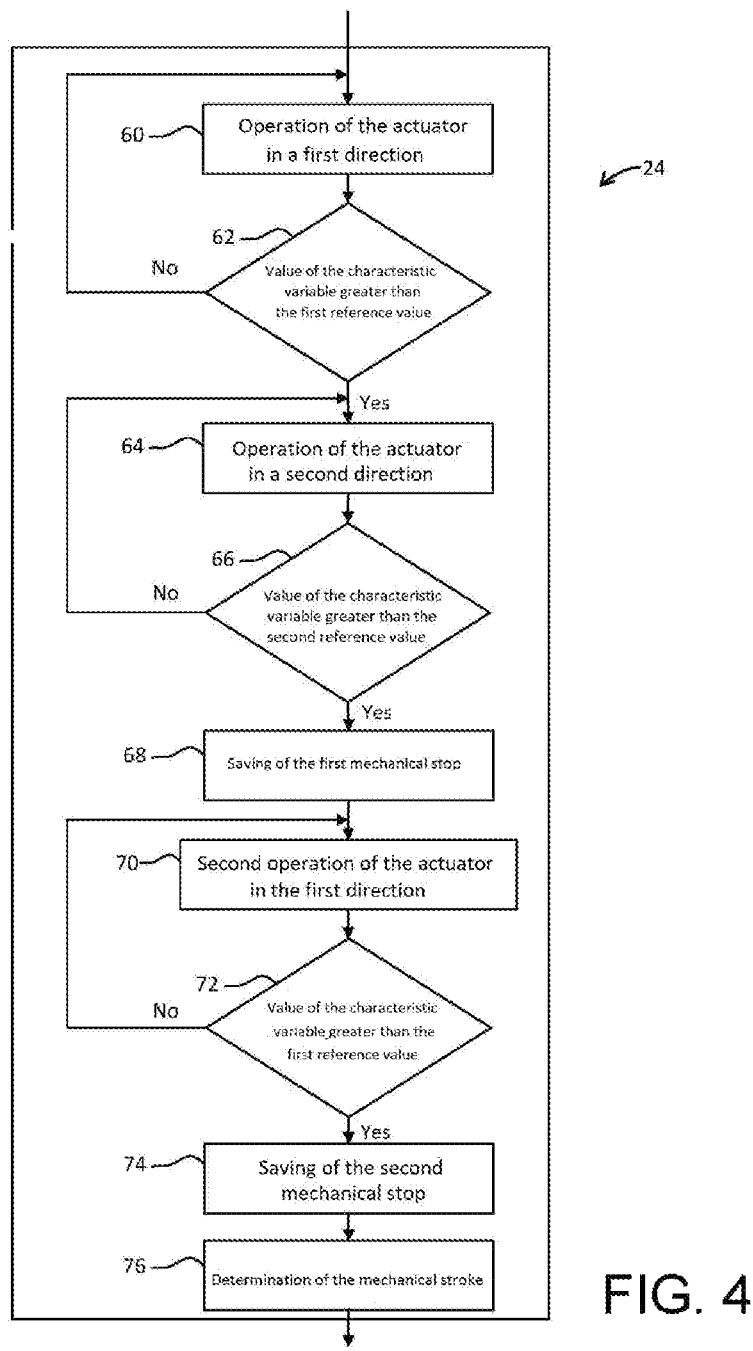
FIG. 4 is a flow chart illustrating the sequence of a mechanical stroke calculation step of the method in FIG. 2.

The method for automatic calibration of the actuation device 1 will now be described, in reference to FIGS. 2, 3 and 4.

A seat 10 equipped with an actuation device 1 to be calibrated is provided. The seat 10 is located in any position before implementation of the automatic calibration method. Furthermore, each actuator 3 is located in any position, a priori unknown.

At least one actuator 3 of the actuation device 1 is not calibrated. For example, the actuation device 1 and the corresponding actuators 3 have been mounted on the seat 10 without being subjected to calibration. According to another example, at least one actuator 3 of the actuation device 1 has been replaced and requires calibration.

During a start-up step 20, an operator activates the calculation unit 4 for implementation of the automatic calibration method by the calculation unit 4.

Then, during a placement step 22, the calculation unit 4 acts on the actuators 3 to place the seat 10, in particular the seat elements 2, in a predetermined reference position.

The reference position is defined beforehand and corresponds, for example, to a configuration wherein the actuators 3 are positioned on one of the mechanical stops thereof, or even at a predetermined position authorising free movement of the actuators 3 without a priori knowledge of the position of the actuators 3. Advantageously, a plurality of reference positions are determined beforehand according to the architecture of the seat 10. During the various steps of the automatic calibration method, one of said reference positions is used among all of said reference positions determined beforehand.

The placement step 22 will more specifically be described later.

Then, once the seat 10 is in the reference position, the calculation unit 4 acts on a designated non-calibrated actuator 3, during a step 24 for calculating the mechanical stroke of the actuator 3, to determine the mechanical stroke of the actuator 3. More specifically, the calculation unit 4 acts on the actuator 3 to determine the minimum mechanical stop and the maximum mechanical stop associated with the actuator 3.

The step 24 for calculating the mechanical stroke of the actuator 3 will be more specifically described later.

Then, during a comparison step 26, the calculation unit 4 compares the mechanical stroke of the actuator 3 with the corresponding auxiliary stroke.

If the mechanical stroke of the actuator 3 is greater than or equal to the auxiliary stroke of the actuator 3, then the step successive to the comparison step 26 is a step 28 for calculating auxiliary stops. During the step 28 for calculating auxiliary stops, the calculation unit 4 calculates the auxiliary stops associated with the actuator 3, using the auxiliary stroke associated with the actuator 3 and the minimum mechanical stop or the maximum mechanical stop of the actuator 3 calculated during the step 24 for calculating the mechanical stroke of the actuator 3.

If the mechanical stroke of the actuator 3 is less than the auxiliary stroke associated with the actuator 3, then the step successive to the comparison step 26 is a step 30 for detecting errors. During the step 30 for detecting errors, the automatic calibration method is interrupted.

After the step 28 for calculating auxiliary stops, the calculation unit 4 determines, during a verification step 32, whether all of the actuators 3 have been calibrated, i.e. whether the steps 22 to 28 have been carried out for all of the actuators 3.

If, during the verification step 32, the calculation unit 4 determines that all of the actuators 3 have been calibrated, then, during a next replacement step 34, the calculation unit 4 controls the actuators 3 of the actuation device 1 to place the seat in a predetermined position of use. The predetermined position of use is such that the position of each actuator 3 is between the minimum auxiliary stop and the maximum auxiliary stop. The predetermined position of use is, for example, the TTL position.

If, during the verification step 32, the calculation unit 4 determines that all of the actuators 3 have not been calibrated, then the step 22 for placing the seat in the reference position and the next steps are implemented for another actuator 3 that has not yet been calibrated, known as "next non-calibrated actuator". The reference position during implementation of the step 22 and the next steps for the next non-calibrated actuator 3 is potentially different from the reference position corresponding to the verification step 32 that was carried out more recently.

The step successive to the replacement step 34 is an exit step 36, during which the seat 10 may be used by an end user.

The exit step 36 is also the step successive to the step 30 for detecting errors. In this case, an operator may intervene on the actuation device to determine the causes of failure of the automatic calibration method.

The placement step 22 will now be described in reference to FIG. 3.

The placement step 22 includes a phase 40 for operating an actuator 3 among all of the actuators of the actuation device 1. During the operating phase 40, the calculation unit 4 controls the actuator 3 to cause the movement thereof.

Simultaneously, during a monitoring phase 42, the calculation unit 4 determines whether a corresponding predetermined condition, among a set of predetermined conditions, is met.

Preferably, the predetermined conditions are successive and organised according to a pre-established sequence. In this case, the calculation unit 4 checks the fulfilment of a given condition only if the preceding conditions have already been verified, according to the corresponding order.

For example, the calculation unit 4 is configured to first determine whether the value of the characteristic variable associated with the actuator 3 is greater than the value of the corresponding predetermined reference. For example, in the case on an electric actuator, the calculation unit 4 is configured to determine whether the electric current consumed by the actuator 3 is greater than a reference current.

For example, the calculation unit 4 is configured to then determine whether a time setpoint has been reached. Such a time setpoint corresponds to a maximum period elapsed between the actuation of the actuator during the operating phase 40 and a current instant.

For example, if the actuator 3 is calibrated, the calculation unit 4 is configured to then determine whether a reference position of the actuator 3 has been reached.

If all of the predetermined conditions are met, then, during a next control phase 44, the calculation unit 4 determines whether the seat 10 is located in the reference position. If the seat 10 is located in the reference position, then the next step is the step 24 for calculating the mechanical stroke.

So long as the predetermined condition is not met, the calculation unit 4 continues to control the movement of the actuator 3 in accordance with the operating phase 40.

If, during a monitoring phase 42, the calculation unit 4 determines that the predetermined condition is met, but that all of the conditions of the sequence are not met, then the calculation unit 4 determines that the seat 10 is not located in the reference position. In this case, during a follow-up phase 46, the calculation unit 4 assesses whether the movement of the actuator 3 in an opposite direction is required, in accordance with the pre-established sequence.

In the case where the calculation unit 4 determines that the movement of the actuator 3 in an opposite direction is required, then, during the operating phase 40, the calculation unit 4 controls the movement of the actuator 3 in a direction opposite to the movement of the actuator 3 during the previous operating phase 40. Simultaneously, during the monitoring phase 42, the calculation unit 4 assesses whether a new predetermined condition is met.

If, during the follow-up phase 46, the calculation unit 4 determines that the movement of the actuator 3 in an opposite direction is not required, then, during the same follow-up phase 46, the calculation unit 4 assesses whether the movement of the actuator 3 in the same direction is required.

In the case where the movement of the actuator 3 in the same direction is required, then, during the operating phase 40, the calculation unit 4 controls the movement of the actuator 3 in the same direction; simultaneously, during the monitoring phase 42, the calculation unit 4 determines whether a new predetermined condition is met. Preferably, the new predetermined condition is the next predetermined condition of the pre-established sequence of conditions. Otherwise, during the follow-up phase 46, the calculation unit 4 determines that the actuator 3 to be controlled during the operating phase 40 is a different actuator 3 than the current actuator 3.

The operating 40, monitoring 42 and follow-up 46 phases are repeated until the seat 10 is located in the reference position.

The step 24 for calculating the mechanical stroke will now be described in reference to FIG. 4.

The step 24 for calculating the mechanical stroke includes an operating phase 60 in a first direction of the actuator 3. During the operating phase 60 in a first direction, the calculation unit 4 controls the actuator 3 to cause the movement thereof in a first direction.

Simultaneously, during a first monitoring phase 62, the calculation unit 4 determines whether, for the actuator 3, the value of the characteristic variable associated with the actuator 3 is greater than a first predetermined reference value.

So long as the value of the characteristic variable associated with the actuator 3 is less than or equal to the first reference value, the calculation unit 4 continues to control the movement of the actuator 3 in the first direction, in accordance with the first operating phase 60.

If the value of the characteristic variable associated with the actuator 3 exceeds the first reference value, then, during an operating phase 64 in a second direction, the calculation unit 4 controls the actuator 3 to cause the movement thereof in a second direction opposite to the first direction.

Simultaneously, during a second monitoring phase 66, the calculation unit 4 determines whether the value of the characteristic variable associated with the actuator 3 is greater than a second predetermined reference value.

So long as the value of the characteristic variable associated with the actuator 3 is less than or equal to the second reference value, the calculation unit 4 continues to control the movement of the actuator 3 in the second direction, in accordance with the operating phase 60 in the second direction.

If the value of the characteristic variable associated with the actuator 3 exceeds the second reference value, then, during the first saving phase 68, the calculation unit 4 saves the position of the actuator 3, corresponding to a first mechanical stop of the actuator 3.

Then, during a second operating phase 70 in the first direction, the calculation unit 4 controls the actuator 3 to cause the movement thereof in the first direction.

Simultaneously, during a third monitoring phase 72, the calculation unit 4 determines whether the value of the characteristic variable associated with the actuator 3 is greater than the first reference value.

So long as the value of the characteristic variable associated with the actuator 3 is less than or equal to the first reference value, the calculation unit 4 continues to control the movement of the actuator 3 in the first direction, in accordance with the second operating phase 70 in the first direction.

If the value of the characteristic variable associated with the actuator 3 exceeds the first reference value, then, during a second saving phase 74, the calculation unit 4 saves the position of the actuator 3, corresponding to a second mechanical stop of the actuator 3.

For example, the first reference value and the second reference value are different.

For example, each one among the first reference value and the second reference value is variable over time and/or according to the position of the actuator 3.

Then, during a phase 76 for determining the mechanical stroke, the calculation unit 4 calculates the mechanical stroke associated with the actuator 3. The mechanical stroke of the actuator is taken equal to the absolute value of the difference between the position associated with the first mechanical stop and the position associated with the second mechanical stop of the actuator 3.

Then, the calculation unit 4 implements the step 26 previously described.

After said steps, in particular after the replacement step 34, the actuation device 1 is entirely calibrated, without having to position the seat 10 in a predefined configuration and without having needed the intervention of an operator during the calibration.

The invention therefore makes it possible to incorporate the actuation device 1 on the seat 10, regardless of the position of the seat 10, and the automatic calibration of the actuators 3 in place on the seat 10, and this without the intervention of an operator.

The phases for operating the actuator 3 in a first direction and a second direction lead to the accurate determination of the mechanical and electrical stops of the actuator, and may lead to the detection of faults at the level of the stroke of the actuators 3.

The various phases of the placement step 22 lead to the automatic placement of the seat in a desired reference position for the calibration of a given actuator 3, which makes the intervention of an operator superfluous during the calibration of the actuator 3.

Using a plurality of different conditions (comparing the value of the characteristic variable associated with the actuator 3 with a reference value, reaching a time setpoint, reaching a reference position of a calibrated actuator 3) during the placement step 22 provides significant versatility for the actuation device 1, in particular to be adapted to various positions in which the seat 10 may be located during calibration of the actuators 3.

The invention claimed is:

1. A method for automatic calibration of an actuation device of at least one seat element to be actuated of a seat, the actuation device comprising a calculation unit and at least one actuator configured to actuate said at least one seat element to be actuated, wherein the method comprises the steps of:
   controlling, by the calculation unit, a movement of each actuator to place each said at least one seat element to be actuated of the seat in a predetermined reference position;
   for each actuator:
      operating the movement of the actuator in a first direction to move said at least one seat element towards a first position;
      comparing a value of a characteristic variable associated with the actuator with a predetermined first reference value;
      if the value of the characteristic variable exceeds the first reference value, operating the movement of the actuator in a second direction opposite to the first direction to move said at least one seat element towards a second position that is different than the first position;
      comparing the value of the characteristic variable associated with the actuator with a predetermined second reference value;
      if the value of the characteristic variable exceeds the second reference value, saving a position occupied by the actuator as the position of a first mechanical stop of the actuator, wherein the first mechanical stop of the actuator corresponds to said second position of said at least one seat element, wherein the method further comprises, for each actuator, the steps of:
   second operation of the movement of the actuator in the first direction to move said at least one seat element towards the first position;
   comparing the value of the characteristic variable associated with the actuator with the predetermined first reference value;
   if the value of the characteristic variable exceeds the first reference value, saving the position occupied by the actuator as the position of a second mechanical stop of the actuator, wherein the second mechanical stop of the actuator corresponds to said first position of said at least one seat element.

2. The method according to claim 1, comprising the determination of a mechanical stroke of the actuator, the mechanical stroke of the actuator being taken equal to the absolute value of the difference between the position associated with the first mechanical stop and the position associated with the second mechanical stop of the actuator.

3. The method according to claim 2 further comprising the steps of:
   comparing the calculated mechanical stroke of the actuator with a predetermined positive auxiliary stroke associated with the actuator;
   if the calculated mechanical stroke is greater than or equal to the auxiliary stroke, calculating a minimum auxiliary stop and a maximum auxiliary stop of the actuator,
   the minimum auxiliary stop being calculated by adding a positive predetermined offset to the smallest among the first mechanical stop and the second mechanical stop, the maximum auxiliary stop being calculated by adding the auxiliary stroke to the calculated minimum auxiliary stop or
   the maximum auxiliary stop being calculated by taking away a positive predetermined offset from the largest among the first mechanical stop and the second mechanical stop, the minimum auxiliary stop being calculated by taking away the auxiliary stroke from the calculated maximum auxiliary stop.

4. The method according to claim 1, wherein, before the step of controlling the movement of each actuator to place each seat element to be actuated in a predetermined reference position, the seat is located in any position and each actuator is located in any position.

5. The method according to claim 1, wherein the step of controlling the movement of each actuator to place each seat element to be actuated in a predetermined reference position comprises, so long as the seat is not located in the predetermined reference position:
   the operation of the movement of a given actuator in a first direction;
   the monitoring of the verification of a predetermined condition of a pre-established sequence of conditions;
   if the predetermined condition is met, then:
      if the movement of the actuator in the first direction is required by the sequence of conditions, operating the movement of the actuator in the first direction and monitoring the verification of a next predetermined condition of the pre-established sequence of conditions;
      if the movement of the actuator in a second direction, opposite to the first direction, is required by the pre-established sequence of conditions, operating the movement of the actuator in the second direction and monitoring the verification of a next predetermined condition of the pre-established sequence of conditions;
      if neither the movement of the actuator in the first direction nor the movement of the actuator in the second direction is required by the pre-established sequence of conditions, operating the movement of a different actuator and monitoring the verification of a next predetermined condition of the pre-established sequence of conditions.

6. The method according to claim 5, wherein at least one condition is chosen among the group consisting of:
the value of the characteristic variable associated with the actuator is greater than a reference value;
a time setpoint has been reached, the time setpoint corresponding to a maximum period elapsed between the actuation of the actuator during the operation of the movement of the actuator and a current instant; and
a reference position of the actuator has been reached, if the actuator is already calibrated.

7. The method according to claim 1, wherein one of the first and second mechanical stops is a maximum mechanical stop, and wherein the other of the first and second mechanical stops is a minimum mechanical stop.

8. The method according to claim 7, wherein the minimum mechanical stop is reached when the actuator is located in a completely retracted position, or when said at least one seat element is incapable of moving further in the first or second direction, and wherein the maximum mechanical stop is reached when the actuator is located in a completely deployed position, or when said at least one seat element is incapable of moving further in said first or second direction.

9. An actuation device including a calculation unit configured to:
control a movement of each actuator among at least one actuator, each actuator being configured to actuate at least one seat element to be actuated of a seat, to place each said at least one seat element to be actuated in a predetermined reference position;
for each actuator:
operate the movement of the actuator in a first direction to move said at least one seat element towards a first position;
compare a value of a characteristic variable associated with the actuator with a predetermined first reference value;
if the value of the characteristic variable exceeds the first reference value, operate the movement of the actuator in a second direction opposite to the first direction to move said at least one seat element towards a second position that is different than the first position;
compare the value of the characteristic variable associated with the actuator with a predetermined second reference value;
if the value of the characteristic variable exceeds the second reference value, save a position occupied by the actuator as the position of a first mechanical stop of the actuator, wherein the first mechanical stop of the actuator corresponds to said second position of said at least one seat element,
the calculation unit being further configured to, for each actuator:
operate a second time the movement of the actuator in the first direction to move said at least one seat element towards the first position;
compare the value of the characteristic variable associated with the actuator with the predetermined first reference value; and
if the value of the characteristic variable exceeds the first reference value, save the position occupied by the actuator as the position of a second mechanical stop of the actuator, wherein the second mechanical stop of the actuator corresponds to said first position of said at least one seat element.

10. A seat being equipped with an actuation device according to claim 9, the actuation device being configured to control the position of the seat elements.

11. The actuation device according to claim 9, wherein one of the first and second mechanical stops is a maximum mechanical stop, and wherein the other of the first and second mechanical stops is a minimum mechanical stop.

12. The actuation device according to claim 11, wherein the minimum mechanical stop is reached when the actuator is located in a completely retracted position, or when said at least one seat element is incapable of moving further in the first or second direction, and wherein the maximum mechanical stop is reached when the actuator is located in a completely deployed position, or when said at least one seat element is incapable of moving further in said first or second direction.

* * * * *